(12) United States Patent
Willcox et al.

(10) Patent No.: US 11,041,773 B2
(45) Date of Patent: Jun. 22, 2021

(54) SENSOR BODY CELL OF A PRESSURE SENSOR

(71) Applicant: Rosemount Inc., Shakopee, MN (US)

(72) Inventors: Charles Ray Willcox, Chanhassen, MN (US); Jennifer Ann Blodgett, Saint Bonifacius, MN (US); David Andrew Broden, Andover, MN (US); Brian Michael Affias, Prior Lake, MN (US)

(73) Assignee: ROSEMOUNT INC., Shakopee, MN (US)

( * ) Notice: Subject to any disclaimer, the term of this patent is extended or adjusted under 35 U.S.C. 154(b) by 168 days.

(21) Appl. No.: 16/368,265

(22) Filed: Mar. 28, 2019

(65) Prior Publication Data

US 2020/0309631 A1  Oct. 1, 2020

(51) Int. Cl.
*G01L 19/06* (2006.01)
*G01L 13/02* (2006.01)
*G01L 19/00* (2006.01)

(52) U.S. Cl.
CPC ........ *G01L 19/0645* (2013.01); *G01L 13/025* (2013.01); *G01L 19/0023* (2013.01)

(58) Field of Classification Search
CPC .............. G01L 13/025; G01L 19/0645; G01L 19/0023; G01L 19/14; G01L 19/142; G01L 19/147; G01D 11/24; G01D 11/245
USPC .......................................... 73/715, 718, 756
See application file for complete search history.

(56) References Cited

U.S. PATENT DOCUMENTS

| | | | |
|---|---|---|---|
| 4,612,812 A * | 9/1986 | Broden | G01L 9/0072 361/283.4 |
| 5,094,109 A | 3/1992 | Dean et al. | |
| 6,295,875 B1 * | 10/2001 | Frick | G01L 9/0075 73/718 |
| 6,516,672 B2 | 2/2003 | Wang | |
| 6,675,655 B2 | 1/2004 | Broden et al. | |
| 7,870,791 B2 | 1/2011 | Hedtke | |
| 8,752,433 B2 | 6/2014 | Hedtke | |
| 9,234,776 B2 | 1/2016 | Strei | |
| 2014/0083171 A1 | 3/2014 | Strei et al. | |
| 2017/0167936 A1 * | 6/2017 | Jochem | G01L 19/0618 |

FOREIGN PATENT DOCUMENTS

WO    WO 00/70321    11/2000

OTHER PUBLICATIONS

Notification of Transmittal of the International Search Report and the Written Opinion of the International Searching Authority from International Application No. PCT/US2020/020272, dated Jun. 8, 2020.

* cited by examiner

*Primary Examiner* — Benjamin R Schmitt
(74) *Attorney, Agent, or Firm* — Westman, Champlin & Koehler, P.A.

(57) ABSTRACT

A sensor body cell for use in a pressure sensor includes a metal housing and an insulating cell. The metal housing has a first cavity with a first conical inner surface. A portion of the first conical inner surface is concave. The insulating cell includes a first seal portion within the first cavity and forms a seal with the first conical inner surface.

20 Claims, 6 Drawing Sheets

SENSOR BODY CELL OF A PRESSURE SENSOR

FIELD

Embodiments of the present disclosure relate to pressure sensors used in industrial process measurement and control systems and, more specifically, to sensor body cells for use in differential pressure sensors.

BACKGROUND

Embodiments of the present disclosure relate to pressure transmitters of the type used in industrial process measurement and control systems and, more specifically, to a pressure sensor for use in a pressure transmitter.

Pressure transmitters are used in industrial process control systems to monitor pressures of process fluids using a pressure sensor that provides an output in response to process fluid pressures. The pressure sensor is typically coupled to the process fluid through an isolation arrangement to prevent exposure of the pressure sensor to the process fluid. The isolation arrangement typically includes one or more isolation diaphragms that are each exposed to the process fluid, and one or more isolation fluid lines each containing an isolation fluid to couple the pressure sensor to the isolation diaphragms. One well known type of pressure transmitter is the Model 3051 transmitter available from Rosemount Inc. of Shakopee, Minn. Pressure transmitters are also shown in U.S. Pat. No. 5,094,109, for example.

Some pressure transmitters include differential pressure sensors, which detect a difference between two pressures. The pressure difference detected by the differential pressure sensor may be used to determine a flow rate of the process fluid and other parameters, for example.

Differential pressure sensors conventionally include a pair of sensor body cells. The sensor body cells define an interior cavity in which a diaphragm is supported. The diaphragm divides the cavity into two halves, each of which is coupled to a different pressure input relating to the process fluid through one of the isolation fluid lines. A deflection of the diaphragm in response to the pressure difference between the the cavity halves may be detected using capacitor electrodes of the sensor body cells. The detected deflection of the diaphragm is then used to produce a differential pressure output indicating the pressure difference between the cavity halves.

The sensor body cells each include a metal housing and a glass-to-metal seal or glass insulating cell contained within a cavity of the metal housing. The insulating cell operates to provide a seal between the metal housing and a fluid pathway from one of the isolation fluid lines to one of the cavity halves. Additionally, the insulating cell may provide a seal between the metal housing and lead lines that are coupled to the capacitor electrodes. Lastly, the glass provides electrical insulation between the electrodes and the cell body.

The sensor body cells are manufactured through a glassing operation during which glass or ceramic that is used to form the insulating cell is fused within a cavity of the metal housing and allowed to cool. During the cooling phase, the insulating cell is subject to tensile stresses caused by differences in rates of thermal expansion between the insulating cell and the metal housing. These tensile stresses can lead to cracking of the insulating cell and increased manufacturing costs.

SUMMARY

Embodiments of the present disclosure generally relate to sensor body cells for use in pressure sensors, and differential pressure sensors that include the sensor body cells. In some embodiments, the sensor body cell includes a metal housing and an insulating cell. The metal housing has a first cavity with a first conical inner surface. A portion of the first conical inner surface is concave. The insulating cell includes a first seal portion within the first cavity and forms a seal with the first conical inner surface.

Some embodiments of the differential pressure sensor include first and second sensor body cells and a diaphragm supported within an interior cavity formed between the first and second sensor body cells. Each of the sensor body cells includes a metal housing and an insulating cell. The metal housing has a first cavity with a first conical inner surface. A portion of the first conical inner surface is concave. The insulating cell includes a first seal portion within the first cavity and forms a seal with the first conical inner surface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
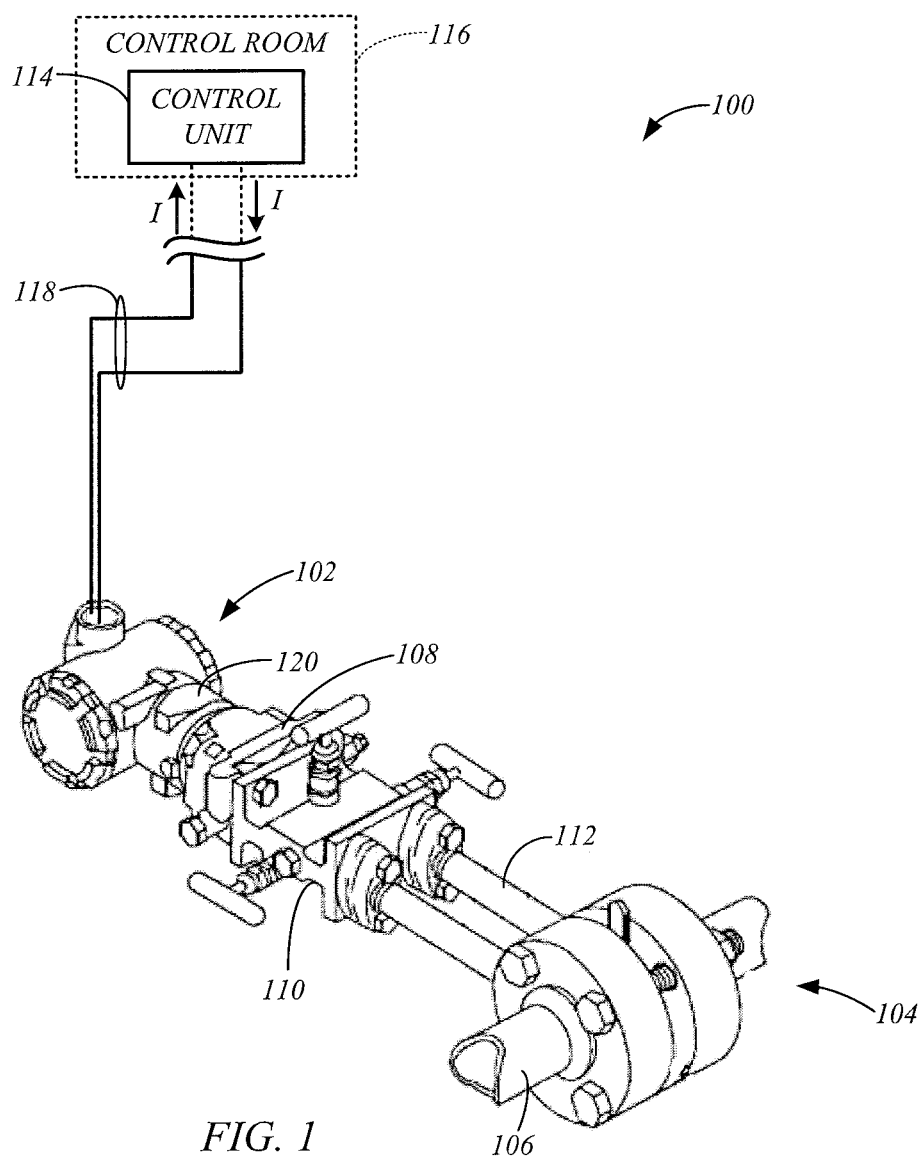
FIG. 1 is a simplified diagram of an exemplary industrial process measurement or control system including a differential pressure transmitter, in accordance with embodiments of the present disclosure.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

FIG. 1 is a simplified diagram of an exemplary industrial process measurement or control system 100, in accordance with embodiments of the present disclosure. The system 100 may be used in the processing of a material to transform the material from a less valuable state into more valuable and useful products, such as petroleum, chemicals, paper, food, etc. For example, an oil refinery performs industrial processes that can process crude oil into gasoline, fuel oil, and other petrochemicals.

The system 100 includes a transmitter 102 that utilizes a pressure sensor, which is formed in accordance with embodiments of the present disclosure, to measure or sense a pressure (e.g., differential pressure) relating to a process 104. In some embodiments, the process 104 involves a process material, such as a fluid (i.e., liquid or gas), that is contained or transported through a process vessel 106, such as a pipe, a tank, or another process vessel. The transmitter 102 may be coupled to the industrial process 104 through an adapter 108, a manifold 110 and a process interface 112, for example.

The transmitter 102 may communicate process information with a computerized control unit 114, which may be remotely located from the transmitter 102, such as in a control room 116 for the system 100, as shown in FIG. 1. The process information may include, for example, a differential pressure or a related process parameter, such as a flow rate of a fluid flow through the vessel that is based on the differential pressure.

The control unit 114 may be communicatively coupled to the transmitter 102 over a suitable physical communication link, such as a two-wire control loop 118, or a wireless communication link. Communications between the control unit 114 and the transmitter 102 may be performed over the control loop 118 in accordance with conventional analog and/or digital communication protocols. In some embodiments, the control loop 118 includes a 4-20 milliamp control loop, in which a process variable may be represented by a level of a loop current I flowing through the control loop 118. Exemplary digital communication protocols include the modulation of digital signals onto the analog current level of the two-wire control loop 118, such as in accordance with the HART® communication standard. Other purely digital techniques may also be employed including FieldBus and Profibus communication protocols.

The transmitter or transmitter 102 may also be configured to communicate wirelessly with the control unit 114 using a conventional wireless communication protocol. For example, the transmitter 102 may be configured to implement a wireless mesh network protocol, such as WirelessHART® (IEC 62591) or ISA 100.11a (IEC 62734), or another wireless communication protocol, such as WiFi, LoRa, Sigfox, BLE, or any other suitable protocol.

Power may be supplied to the transmitter 102 from any suitable power source. For example, the transmitter 102 may be wholly powered by the current I flowing through the control loop 118. One or more power supplies may also be utilized to power the transmitter 102, such as an internal or an external battery. An electrical power generator (e.g., solar panel, a wind power generator, etc.) may also be used to power the transmitter 102, or charge a power supply used by the transmitter 102.

Figure 2:
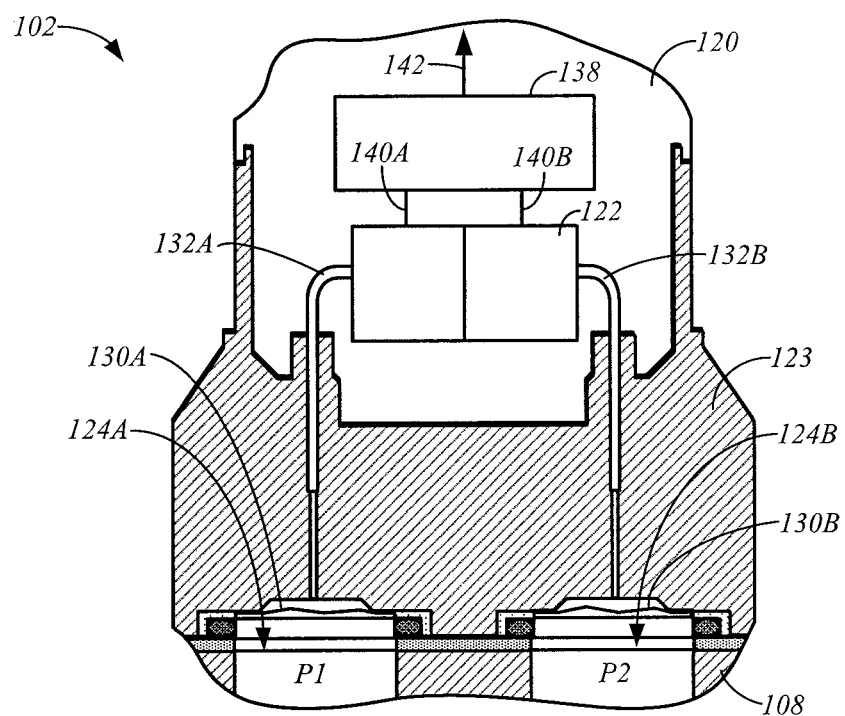
FIG. 2 is a simplified cross-sectional view of a portion of the transmitter of FIG. 1, in accordance with embodiments of the present disclosure.

FIG. 2 is a simplified cross-sectional view of a portion of the transmitter 102 and adapter 108 of FIG. 1, in accordance with embodiments of the present disclosure. The transmitter 102 may include a housing 120 that encloses and protects electronics of the transmitter 102 from environmental conditions including a differential pressure sensor 122. The housing 120 includes a base 123 that may include one or more process openings 124, such as process openings 124A and 124B. The process openings may be coupled to the process 104 through suitable connections, such as through the adapter 108 (attached to the base 123 in FIG. 2), the manifold 110, and/or process interface 112, as shown in FIG. 1.

The exemplary transmitter 102 may include diaphragms 130A and 130B that are respectively exposed to pressures P1 and P2 of the process 104 that are respectively presented to the process openings 124A and 124B, as shown in FIG. 2. The diaphragms 130A and 130B flex in response to the pressures P1 and P2. The flexing diaphragms 130A and 130B communicate the sensed pressure to the pressure sensor 122 through lines 132A and 132B, which may be filled with an incompressible fluid (e.g., hydraulic fluid).

The differential pressure sensor 122 generates one or more output signals (e.g., capacitance signals) in response to the sensed difference between the pressures P1 and P2. The output signals may be delivered to measurement circuitry 138 through lead wires 140A and 140B or another suitable connection, and the measurement circuitry 138 may be used to process the output signals and produce a differential pressure signal 142. The transmitter 102 may communicate the differential pressure measurement indicated by the signal 142 to the control unit 114 using any suitable technique, such as by adjusting the current I over the two-wire control loop 118, as discussed above with reference to FIG. 1.

Figure 3:
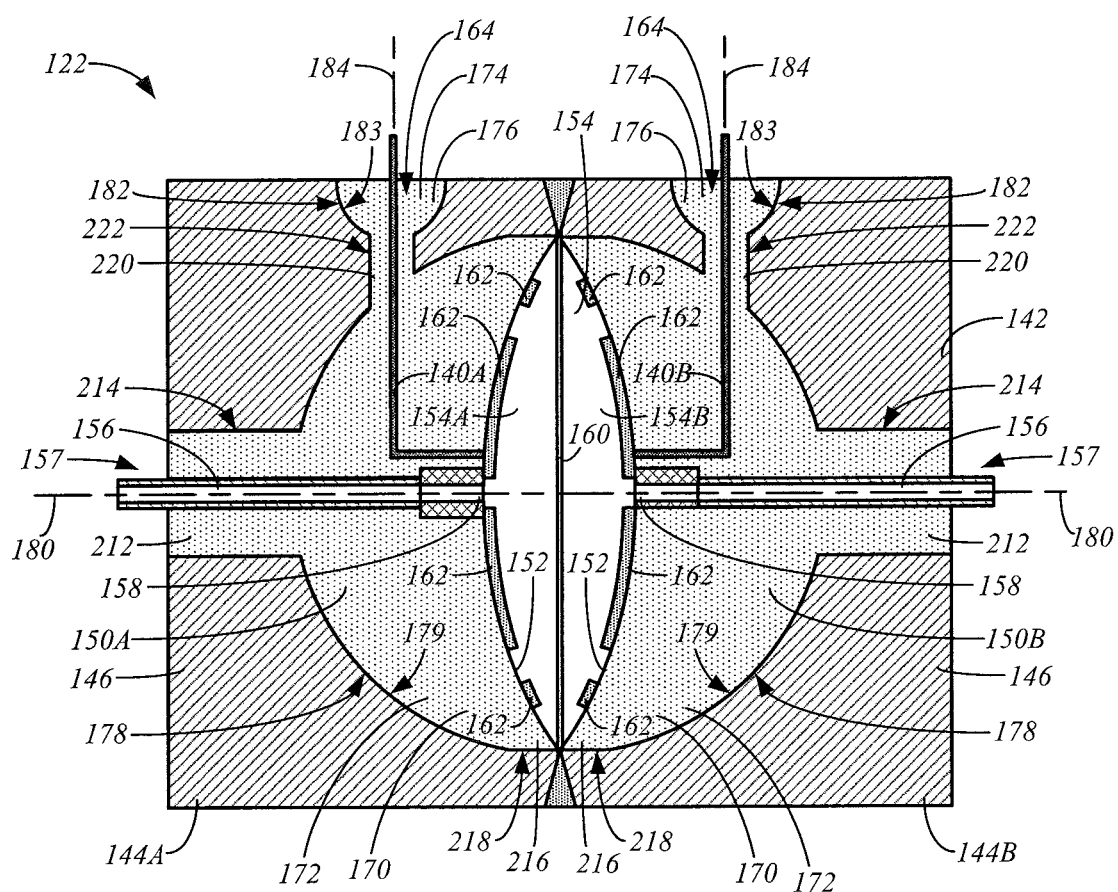
FIG. 3 is a simplified side cross-sectional view of a differential pressure sensor, in accordance with embodiments of the present disclosure.

FIG. 3 is a simplified side cross-sectional view of a differential pressure sensor 122, in accordance with embodiments of the present disclosure. The sensor 122 includes a pair of sensor body cells 144A and 144B, which may be generally referred to as cells 144. Each of the cells 144 includes a cup-like metal housing 146, to which ceramic or glass (hereinafter "glass") is fused to faun glass-to-metal seals or glass insulating cells 150 (hereinafter "insulating cells"), such as insulating cells 150A and 150B.

The cells 150 include concave walls 152 that define an interior cavity 154. Fluid pathways 156 of each sensor body cell 144 extend through openings 157 of the metal housings 146, and through the cells 150 to openings 158 in the walls 152, and couple the lines 132 to the interior cavity 154, which is also filled with the incompressible fluid. A sensing diaphragm 160 divides the cavity 154 into two generally equal and opposite cavity halves 154A and 154B. The diaphragm 160 deflects in response to the process pressures P1 and P2 that are respectively transferred to the interior cavity halves 154A and 154B through the lines 132A and 132B and the fluid pathways 156. The displacement of the deflected diaphragm 160 is proportional to the difference in the pressures P1 and P2.

The position of the diaphragm 160 with respect to the walls 152 is detected using one or more capacitor electrodes 162 of each sensor body cell 144 that are attached to the walls 152. The capacitor electrodes 162 form electrical capacitors having capacitances which vary in response to displacement or deflection of the diaphragm 160 relative to the walls 152 due to the applied pressures P1 and P2. The lead wires 140A and 140B extend through openings 164 in the metal housings 146 and electrically connect the one or more capacitor electrodes 162 to the measurement circuitry 138. The measurement circuitry 138 can convert the detected capacitances of the electrodes 162 into the differential pressure output signal 142, which, for example, may be communicated to the control unit 114 (FIG. 1) or another computing device.

The insulating cells 150 each include a glass seal portion 170 within a cavity 172 of the metal housing 146 that provides a seal between the metal housing 146 and the fluid pathways 156, and a seal portion 174 within a cavity 176 of the metal housing 146 that provides a seal between the metal housing 146 and the lead wires 140 or pathways containing the lead wires 140. The manufacture of the insulating cells 150 of the sensor body cells 144 involves a glassing operation, during which the cavities 172 and 176 of each metal housing 146 is filled with molten glass (hot phase) and then allowed to cool (cooling phase). Thus, the shape of the cavities 172 and 176 of the metal housings 146 determines a shape of the seal portions 170 and 174.

In some embodiments, the seal portion 170 includes a conical outer surface 178, which corresponds to a conical inner surface 179 of the housing 146, and is approximately concentric to an axis 180. Similarly, embodiments of the seal portion 174 include a conical outer surface 182, which corresponds to a conical inner surface 183 of the housing 146, and is approximately concentric to an axis 184, as shown in FIG. 3. Embodiments of the present disclosure relate to improvements in the shape of the conical surfaces 178 and 182 of the seal portions 170 and 174 over conventional sensor body cells.

Figure 4:
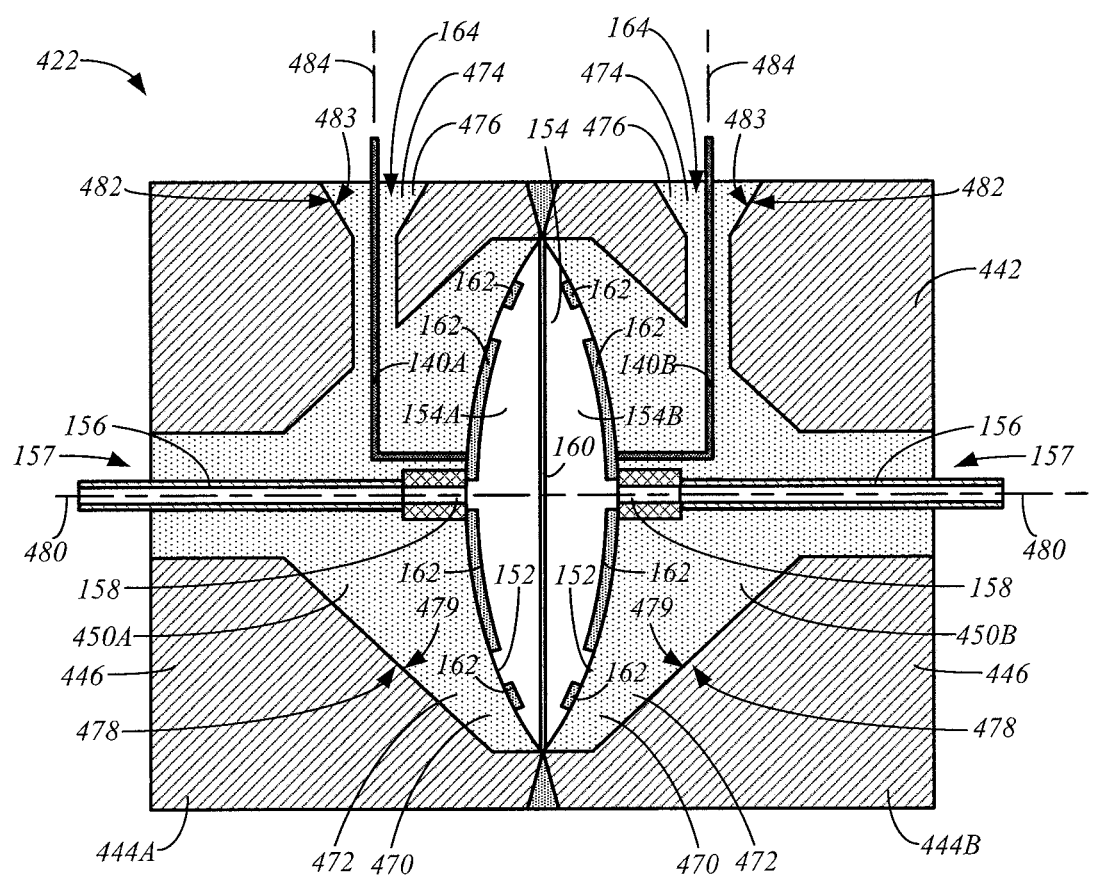
FIG. 4 is a simplified side cross-sectional view of a differential pressure sensor, in accordance with the prior art.

FIG. 4 is a simplified side cross-sectional view of a differential pressure sensor 422, in accordance with the prior art. Elements of FIG. 4 having the same or similar reference as the element shown in FIG. 3 generally relate to the same or similar element. The differential pressure sensor 422 includes a pair of sensor body cells 444A and 444B. The cells 444 each have metal housings 446 containing glass-to-metal seals or insulating cells 450A and 450B. The insulating cells 450 each include a seal portion 470 contained in a cavity 472 of the housing 446, and a seal portion 474 contained in the cavity 476, which operates similarly to the seal portions 170 and 174 discussed above.

The seal portion 470 includes a conical surface 478 that corresponds to a surface 479 of the housing 446 and is approximately concentric to an axis 480, and the seal portion 474 includes a conical surface 482 that corresponds to a surface 483 of the housing 446 and is approximately concentric to an axis 484, as shown in FIG. 4. The conical surface 478 of the seal portion 470 is flat, when viewed in a cross-section taken in a plane extending through and parallel to the axis 480, and the conical surface 482 of the seal portion 474 is flat, when viewed in a cross-section taken in a plane extending through and parallel to the axis 484, as shown in FIG. 4. The flat conical surfaces 478 and 482 can adversely affect the manufacture of the sensor body cells 444 and have other disadvantages.

Figure 5A:
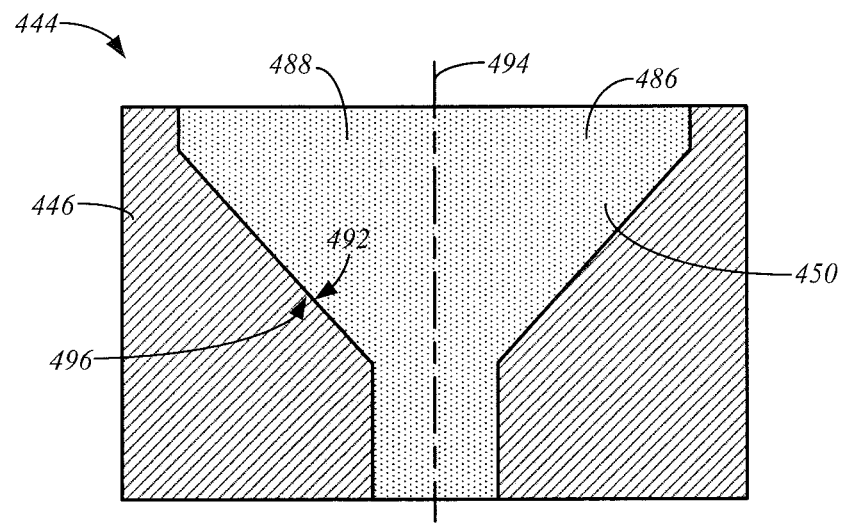
FIGS. 5A and 5B are simplified side cross-sectional views of a conventional sensor body cell during hot and cooling phases of a glassing operation, respectively.
Figure 5B:
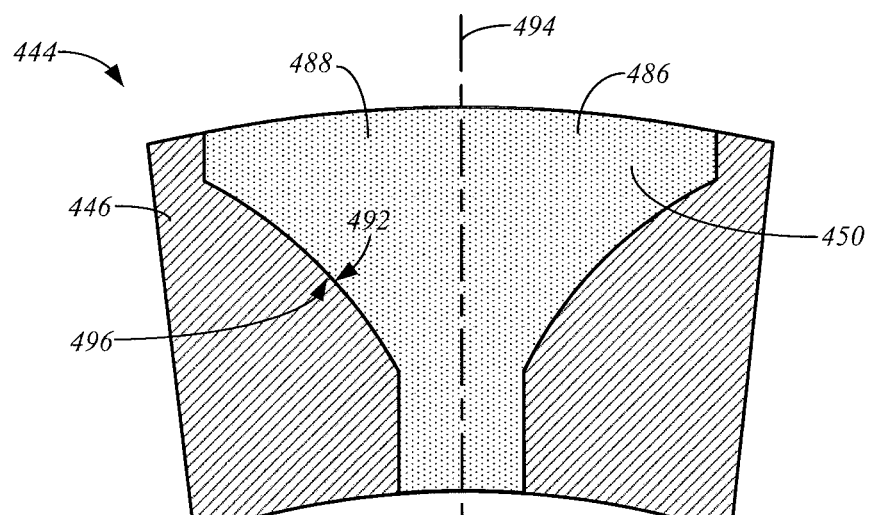

FIGS. 5A and 5B are simplified side cross-sectional views of an insulating cell 450 of a conventional sensor body cell 444 that includes a seal portion 486, which may represent the seal portion 478 or the seal portion 482 (FIG. 4), and the metal housing 446 respectively during hot and cooling phases of a glassing operation. Fluid pathways, lead wires, and capacitor electrodes are not shown to simplify the illustration. Additionally, the degree of shape change illustrated between FIGS. 5A and 5B is exaggerated to better illustrate cooling phase issues with the cells 444 of prior art differential pressure sensors 422.

During the hot phase of the glassing operation, the molten glass seal portion 486 conforms to the cavity 488 of the metal housing 446 in which it is contained, as shown in FIG. 5A. The cavity 488 of the metal housing 446 that receives the molten glass has a conical surface 492 that is flat when viewed in a cross-section along a plane extending through and parallel an axis 494 that is concentric to the conical surface 492, as shown in FIG. 5A. Thus, the seal portion 486 includes a conical surface 496 corresponding to the conical surface 492 that is flat when viewed in a cross-section along a plane extending through and parallel to the axis 494.

As the metal housing 446 and the glass seal portion 486 cool, the insulating cell 444 bows outward as shown in FIG. 5B due to the lower thermal expansion of the glass seal portion 486 relative to the metal housing 446. This creates stresses within the seal portion 486, which cause the previously flat conical surface 496 (FIG. 5A) to bend inwardly into a concave shape, when viewed in a cross-section along a plane extending through and parallel to the axis 494, as shown in FIG. 5B. This inward buckling of the conical surface 496 can result in large tensile stresses in the seal portion 486, which can lead to cracking of the seal portion 486. Additionally, the buckling of the conical surface 496 may cause the seal portion 486 to pull away from the walls of the cavity 488 of the metal housing 446, which can lead to pressure leaks in the sensor 422.

Thus, conventional cells 444 having seal portions 470 and 474 that include flat conical surfaces 478 and 482 during the hot phase of the glassing operation can be costly to manufacture due to cracking of the seal portions 470 or 474 during the cooling phase of the glassing operation.

The sensor body cells 144 formed in accordance with embodiments of the present disclosure shown in FIG. 3 include insulating cells 150 that are subjected to reduced tensile stressing during the cooling phase of the glassing operation relative to the insulating cells 444 used in conventional sensors 422. In some embodiments, the conical surfaces 178 and 182 of the seal portions 170 and 174 of the insulating cell 150 have a convex shape when viewed in a cross-section taken along a plane extending through and approximately parallel to the respective axis 180 or 184, as shown in FIG. 3. The convex conical surfaces 178 and 182 are formed due to their conformance to corresponding conical inner surfaces 179 and 183 of the metal housing 146 during the hot phase of the glassing operation. The conical inner surfaces 179 and 183 of the metal housing 146 are concave or at least include portions that are concave. The convex outer conical surfaces 178 and 182 operate to reduce the tensile stresses in seal portions 170 and 174 of the cell 144 during the cooling phase of the glassing operation relative to the conventional cell 444. As a result, the insulating cells 150 are less likely to crack during the cooling phase of the glassing operation thereby increasing manufacturing efficiency and reducing manufacturing costs.

Figure 6A:
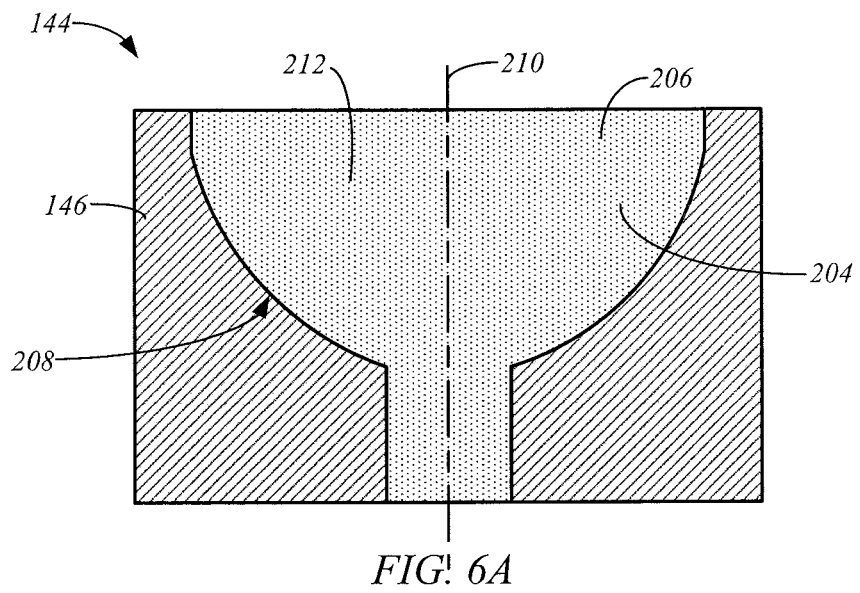
FIGS. 6A and 6B are simplified side cross-sectional views of a sensor body cell in accordance with embodiments of the present disclosure during hot and cooling phases of a glassing operation, respectively.
Figure 6B:
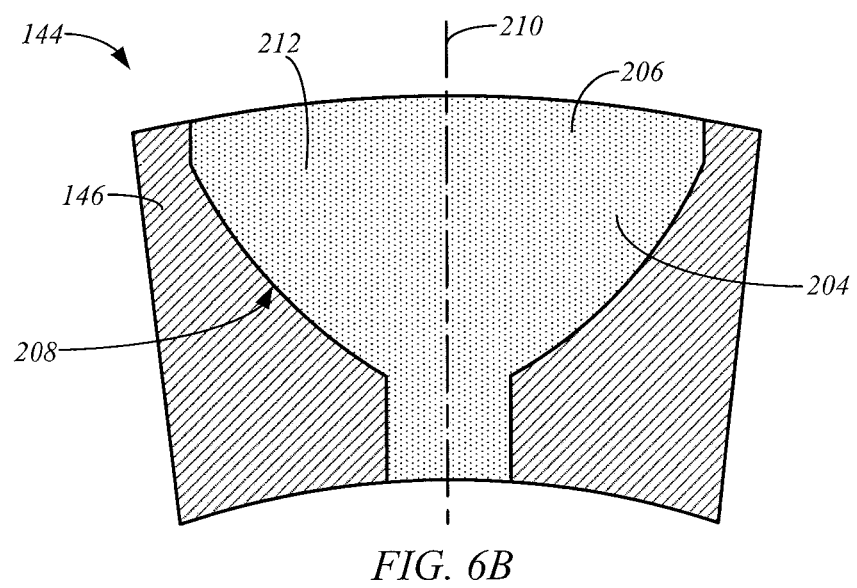

This feature of the seal portions 170 and 174 of the sensor body cell 144 is illustrated in FIGS. 6A and 6B, which are simplified side cross-sectional views of a sensor body cell 144 including an exemplary insulating cell 204 having a seal portion 206 in accordance with embodiments of the present disclosure respectively during hot and cooling phases of a glassing operation. The seal portion 206 includes a convex conical surface 208 that is approximately concentric to an axis 210. The seal portion 206 may represent the seal portions 170 and 174 of the cell 144 of FIG. 3. Thus, the convex conical surface 208 may represent the convex conical surfaces 178 and 182 of the seal portions 170 and 174 of FIG. 3. The fluid pathway 156, lead wires 140, and capacitor electrodes 162 are not shown to simplify the illustration. Additionally, the degree of shape change illustrated between FIGS. 6A and 6B is exaggerated to better illustrate shape changes of the cell 144 during the cooling phase of the glassing operation.

During the hot phase of the glassing operation, the molten seal portion 206 conforms to the inner conical surface of the cavity 212 of the metal housing 146 in which it is contained forming the convex conical surface 208, as shown in FIG.

6A. As the metal housing 146 and the seal portion 206 cool, the sensor body cell 144 bows outward as shown in FIG. 6B due the lower thermal expansion of the glass seal portion 206 relative to the metal housing 146. This creates stresses within the seal portion 206 that cause the convex conical outer surface 208 to bow inwardly, as shown in FIG. 6B. However, the convex conical surface 208 does not buckle in the manner of the conventional seal portion 486 to become concave, as shown in FIG. 5B. Instead, the convex conical surface 208 maintains its convex shape when viewed in a cross-section along a plane that extends through and approximately parallel to the axis 210, resulting in lower tensile stresses in the seal portion 206 relative to those that develop in the conventional seal portions 486, 470 and 474. As a result, the likelihood of the seal portion 206 cracking during the cooling phase of the glassing operation is reduced.

Additionally, during use of the sensor body cell 144 with high line pressures P1 and P2, the tensile stresses in the seal portion 170 can essentially be reversed to compressive forces, which are tolerable by the insulating cells 150. Thus, differential pressure sensors 122 utilizing sensor body cells 144 having insulating cells 150 including seal portions 170 or 174 having the convex conical surfaces 178 or 182 can provide reduced manufacturing and usage costs over conventional differential pressure sensors 422.

In some embodiments, the convex conical surfaces 178 and 182 of the seal portions 170 and 174 may be approximately in the shape of a section of a sphere. Thus, the convex shape of one or both of the conical surfaces 178 and 182 may be an arc of a circle. For example, the convex shape of the conical surface 178 of the seal portion 170 may be an arc of a circle having a radius of approximately 0.5 inches, and the convex shape of the conical surface 182 of the seal portion 174 may be an arc of a circle having a radius of approximately 0.125 inches. Alternatively, the convex shape of one or both of the conical surfaces 178 and 182 may be a section of a parabola, or another curve.

In addition to the curved surfaces described above, some embodiments of the seal portions 170 and/or 174 include sections having flat exterior surfaces. For example, in some embodiments, the seal portion 170 includes a cylindrical section 212 that may be approximately coaxial to the axis 180 and includes a flat exterior surface 214 when viewed in a cross-section taken along a plane extending through and approximately parallel to the axis 180, as shown in FIG. 3. The seal portion 170 may also include a cylindrical section 216 that extends to the concave wall 152, and has a flat exterior surface 218, such as when viewed in a cross-section taken along a plane extending through and approximately parallel to the axis 180. The surfaces 214 and 218 may be parallel to the axis 180, as shown in FIG. 3.

Likewise, the seal portion 174 may include flat surfaces. For example, the seal portion 174 may include a cylindrical section 220 having a flat exterior surface 222 when viewed in a cross-section taken along a plane extending through and approximately parallel to the axis 184, as shown in FIG. 3.

Additional embodiments of the present disclosure relate to a differential pressure sensor 122 having the pair of sensor body cells 144A and 144B formed in accordance with one or more embodiments described herein, as shown in FIG. 3. Accordingly, the differential pressure sensor 122 includes insulating cells 150A and 150B each having the seal portion 170 and/or the seal portion 174 formed in accordance with one or more embodiments described above. Embodiments of the present disclosure also include a field device or transmitter 102 that includes the differential pressure sensor 122, and a process control or measurement system 100 that includes the field device or transmitter 102.

Although the embodiments of the present disclosure have been described with reference to preferred embodiments, workers skilled in the art will recognize that changes may be made in form and detail without departing from the spirit and scope of the present disclosure. As used herein the term "about," "approximately" or "substantially" refers to equality with a tolerance of at most 10%, unless stated otherwise. The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

What is claimed is:

1. A sensor body cell for use in a pressure sensor comprising:
    a metal housing having a first cavity with a first conical inner surface, wherein a portion of the first conical inner surface is concave and formed in a curve having a shape of a parabola or a sphere; and
    an insulating cell comprising a first seal portion within the first cavity and forming a seal with the first conical inner surface wherein the seal is curved in a shape of a parabola or a sphere and seals with the curve of the first conical inner surface.

2. The sensor body cell of claim 1, wherein the first seal portion includes a first conical outer surface corresponding to the first conical inner surface and having a convex shape when viewed in cross-section along a plane extending through and approximately parallel to a first axis that is approximately concentric with the first conical outer surface.

3. The sensor body cell of claim 2, wherein the first conical outer surface is approximately in the shape of a section of a sphere, and the convex shape is an arc of a circle.

4. The sensor body cell of claim 2, wherein the convex shape is a section of a parabola.

5. The sensor body cell of claim 2, wherein the first seal portion includes a cylindrical section that is approximately concentric to the first axis.

6. The sensor body cell of claim 2, wherein:
    the first seal portion includes a concave wall extending transversely to the first axis; and
    the sensor body cell includes a fluid pathway extending through the first seal portion along the first axis to an opening in the concave wall.

7. The sensor body cell of claim 6, including a capacitor electrode attached to the concave wall of the first seal portion.

8. The sensor body cell of claim 2, including:
    a capacitor electrode; and
    a lead wire electrically coupled to the capacitor electrode and including a lead wire portion extending through the first seal portion along the first axis.

9. The sensor body cell of claim 1, wherein:
    the first seal portion includes a concave wall extending transversely to a first axis that is approximately concentric to the first conical inner surface, and the seal is a fluid pathway seal;
    the sensor body cell includes:
        a fluid pathway extending through the first seal portion along the first axis to an opening in the concave wall; and
        a capacitor electrode attached to the concave wall and a lead wire electrically coupled to the capacitor electrode;

the metal housing includes a second cavity with a second conical inner surface, wherein a portion of the second conical inner surface is concave;

the insulating cell includes a second seal portion within the second cavity of the metal housing and forming a seal with the second conical inner surface, the second seal portion including a second conical outer surface corresponding to the second conical inner surface and having a convex shape when viewed in cross-section along a plane extending through and approximately parallel to a second axis that is approximately concentric to the second conical outer surface, wherein the lead wire includes a lead wire portion extending through the second seal portion along the second axis.

10. The sensor body cell of claim 9, wherein at least one of the first and second conical outer surfaces is approximately in the shape of a section of a sphere.

11. The sensor body cell of claim 9, wherein the convex shape of at least one of the first and second conical outer surfaces is a section of a parabola.

12. A differential pressure sensor comprising a diaphragm supported within an interior cavity formed between the concave walls of a pair of the sensor body cells of claim 9.

13. A differential pressure sensor comprising:
first and second sensor body cells, each sensor body cell comprising:
a metal housing having a first cavity with a first conical inner surface, wherein a portion of the first conical inner surface is concave and formed in a curve having a shape of a parabola or a sphere; and
an insulating cell comprising a first seal portion within the first cavity and forming a seal with the first conical inner surface wherein the seal is curved in a shape of a parabola or a sphere and seals with the curve of the first conical inner surface; and
a diaphragm supported within an interior cavity formed between the first and second sensor body cells.

14. The sensor of claim 13, wherein the first seal portion of each insulating cell includes a first conical outer surface corresponding to the first conical inner surface and having a convex shape when viewed in cross-section along a plane extending through and approximately parallel to a first axis that is approximately concentric with the first conical outer surface.

15. The sensor of claim 14, wherein the convex shape of the first conical outer surface of each cell is one of an arc of a circle and a section of a parabola.

16. The sensor of claim 14, wherein:
the first seal portion of each insulating cell comprises a concave wall extending transversely to the first axis; and
each sensor body cell includes:
a fluid pathway extending through the first seal portion along the first axis to an opening in the concave wall; and
a capacitor electrode attached to the concave wall.

17. The sensor of claim 14, wherein each sensor body cell comprises:
a capacitor electrode; and
a lead wire electrically coupled to the capacitor electrode and including a lead wire portion extending through the first seal portion along the first axis.

18. The sensor of claim 14, wherein:
the first seal portion of each insulating cell includes a concave wall extending transversely to the first axis;
each of the sensor body cells includes:
a fluid pathway extending through the first seal portion along the first axis to an opening in the concave wall; and
a capacitor electrode attached to the concave wall and a lead wire electrically coupled to the capacitor electrode;
the metal housing of each sensor body cell includes a second cavity with a second conical inner surface, wherein a portion of the second conical inner surface is concave;
each insulating cell includes a second seal portion within the second cavity of the metal housing and forming a seal with the second conical inner surface, the second seal portion including a second conical outer surface corresponding to the second conical inner surface and having a convex shape when viewed in cross-section along a plane extending through and approximately parallel to a second axis that is approximately concentric to the second conical outer surface, wherein the lead wire includes a lead wire portion extending through the second seal portion along the second axis.

19. The sensor of claim 18, wherein at least one of the first and second conical outer surfaces of each insulating cell is approximately in the shape of a section of a sphere.

20. The sensor of claim 18, wherein at least one of the first and second conical outer surfaces of each insulating cell is approximately in the shape of a section of a parabola.

* * * * *